US009897235B2

(12) United States Patent
Damiens et al.

(10) Patent No.: US 9,897,235 B2
(45) Date of Patent: Feb. 20, 2018

(54) FLEXIBLE PIPE FOR CONVEYING A FLUID, AND RELATED USE AND METHOD

(71) Applicant: TECHNIP FRANCE, Courbevoie (FR)

(72) Inventors: Alexandre Damiens, Berville (FR); Edouard Lecointe, Rio de Janeiro (FR)

(73) Assignee: TECHNIP FRANCE (FR)

( * ) Notice: Subject to any disclaimer, the term of this patent is extended or adjusted under 35 U.S.C. 154(b) by 11 days.

(21) Appl. No.: 14/894,194

(22) PCT Filed: May 27, 2014

(86) PCT No.: PCT/EP2014/060918
§ 371 (c)(1),
(2) Date: Nov. 25, 2015

(87) PCT Pub. No.: WO2014/191393
PCT Pub. Date: Dec. 4, 2014

(65) Prior Publication Data
US 2016/0123505 A1    May 5, 2016

(30) Foreign Application Priority Data

May 29, 2013  (FR) .................................... 13 54876

(51) Int. Cl.
*F16L 11/20*  (2006.01)
*F16L 11/08*  (2006.01)
(Continued)

(52) U.S. Cl.
CPC ........... *F16L 11/081* (2013.01); *F16L 11/083* (2013.01); *F16L 11/12* (2013.01); *F16L 11/20* (2013.01); *F16L 33/01* (2013.01)

(58) Field of Classification Search
CPC ........ F16L 11/081; F16L 11/083; F16L 11/12; F16L 11/22; F16L 33/01
(Continued)

(56) References Cited

U.S. PATENT DOCUMENTS

| 6,053,213 A * | 4/2000 | Jung ....................... F16L 9/147 138/121 |
| 2006/0090808 A1 * | 5/2006 | Dupoiron ................ F16L 11/16 138/135 |

FOREIGN PATENT DOCUMENTS

| EP | 0 937 933 A1 | 8/1999 |
| FR | 2 852 658 A1 | 9/2004 |

(Continued)

OTHER PUBLICATIONS

International Search Report dated Jun. 25, 2014 issued in corresponding International patent application No. PCT/EP2014/060918.
(Continued)

*Primary Examiner* — Craig Schneider
*Assistant Examiner* — David Deal
(74) *Attorney, Agent, or Firm* — Ostrolenk Faber LLP

(57) ABSTRACT

A pipe (10) for conveying a fluid, including an inner sheath (20), at least one layer (34, 36) of inner armors, arranged outside the inner sheath (20) and an outer protection sheath (22), positioned outside each layer (34, 36) of inner armors. It includes an inner fluid, received between the inner sheath (20) and the outer sheath (22). The pipe includes an intermediate polymer sheath (24), interposed between the inner sheath (20) and the outer sheath (22), the intermediate sheath (24) and the inner sheath (20) delimiting an inner annular space (26) between them for receiving the inner fluid. The inner fluid is confined in the inner annular space (26) at a pressure above 50 bars.

21 Claims, 3 Drawing Sheets

(51) Int. Cl.
*F16L 33/01* (2006.01)
*F16L 11/12* (2006.01)

(58) Field of Classification Search
USPC ................................. 138/134, 135, 136, 104
See application file for complete search history.

(56) References Cited

FOREIGN PATENT DOCUMENTS

| FR | 2 915 552 A1 | 10/2008 | |
|----|----|----|----|
| WO | WO 2010/067092 A1 | 6/2010 | |
| WO | WO 2011/026801 A1 | 3/2011 | |
| WO | WO 2011026801 A1 * | 3/2011 | ............ F16L 11/082 |

OTHER PUBLICATIONS

French Search Report dated Nov. 13, 2013 issued in corresponding French patent application No. 1354876.

* cited by examiner

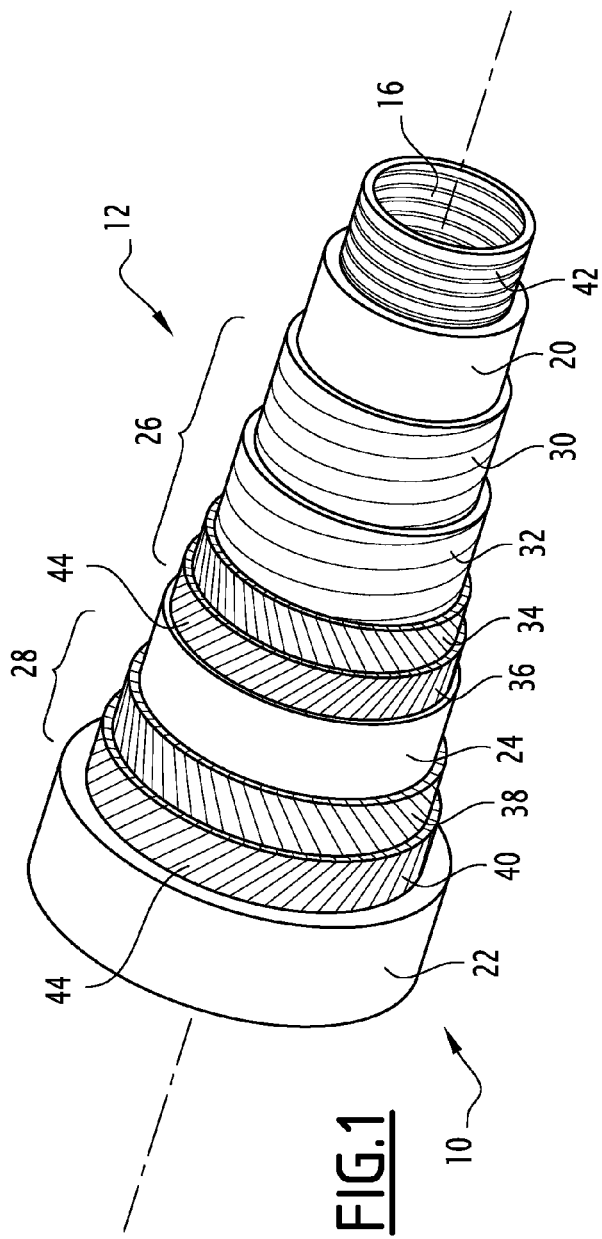
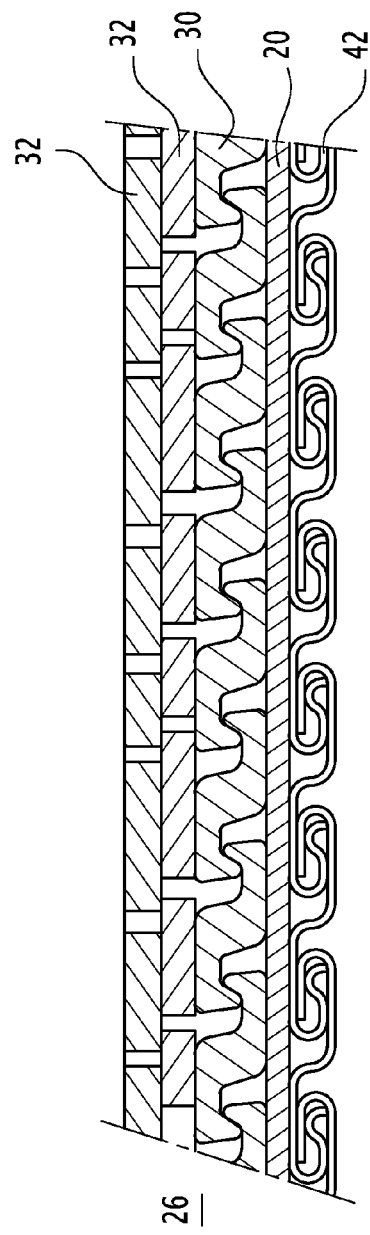
FIG.1
FIG.3

FLEXIBLE PIPE FOR CONVEYING A FLUID, AND RELATED USE AND METHOD

CROSS REFERENCE TO RELATED APPLICATIONS

The present application is a 35 U.S.C. § 371 National Phase conversion of PCT/EP2014/060918, filed May 27, 2014, which claims benefit of French Application No. 13 54876, filed May 29, 2013, the disclosure of which is incorporated herein by reference. The PCT International Application was published in the French language.

TECHNICAL FIELD OF THE INVENTION

The present invention relates to a flexible pipe for conveying a fluid, comprising:
- an inner polymer sheath defining an inner passage for the circulation of a conveyed fluid;
- at least one layer of inner armours, arranged outside the inner sheath;
- a polymer outer protection sheath, positioned outside each layer of inner armours;
- an inner fluid, received between the inner sheath and the outer sheath.

The pipe is in particular a flexible pipe of the unbonded type designed to convey a fluid through an expanse of water, such as an ocean, sea, lake or river.

BACKGROUND OF THE INVENTION

Such a flexible pipe is for example made according to normative documents API 17J (Specification for Unbonded Flexible Pipe) and API RP 17B (Recommended Practice for Flexible Pipe) established by the American Petroleum Institute.

The pipe is generally formed by a set of concentric and superimposed layers. It is considered "unbonded" within the meaning of the present invention when at least one of the layers of the pipe is able to move longitudinally relative to the adjacent layers when the pipe is bent.

In particular, an unbonded pipe is a pipe with no bonding materials connecting the layers forming the pipe.

In a known manner, such a pipe includes a tubular inner structure comprising at least one pressure sheath. The pipe includes plies of tensile armours positioned around the inner tubular structure.

In some cases, the pipe further includes a pressure vault, formed by at least one interlocked wire having a T-shaped profile or a Z-shaped profile. A hoop layer can also be wound in a spiral around the pressure vault.

One example pipe of the aforementioned type is described in WO 2011/026801. This pipe further includes a protection fluid received between the inner sheath and the outer sheath. The protection fluid prevents corrosion of the layers of intermediate armours. It is kept at atmospheric pressure.

The ducts of the aforementioned type generally positioned through an expanse of water, between a bottom assembly, designed to collect the fluid mined in the bottom of the expanse of water, and a floating or non-floating surface assembly designed to connect and distribute the fluid. The surface assembly may be a semisubmersible platform, an FPSO, a stationary platform, a flexible tower, a tension leg platform or any other floating or non-floating assembly.

In some cases, the pipe is used to reinject, into the bottom of the expanse of water, a fluid present on the surface, for example a pressurized gas. This is in particular the case for deposits comprising carbon dioxide-rich hydrocarbons. The carbon dioxide is separated from the surface hydrocarbons and is reinjected into the reservoir under pressure, in order to avoid the dissemination of carbon dioxide into the atmosphere.

In some cases, for the exploitation of fluids in deep water, the flexible pipe has a length exceeding 200 m. Furthermore, the differential pressure necessary for the reinjection of fluid into the reservoir can be very high, for example above 400 bars, or even above 700 bars. Furthermore, the absolute pressure reigning in the bottom of the flexible pipe, which is a combination of very high fluid pressure at the top of the pipe and the exerted hydrostatic pressure, can be very high, for example approximately 1300 bars.

When the fluids are conveyed at very high pressures, the ducts with a traditional construction of the aforementioned type can be limited, particularly for use in a dynamic application.

Indeed, fatigue phenomena, and more particularly fatigue-fretting phenomena, may appear on the pressure vault and the spiral hoop layer.

This fatigue alters the mechanical properties of the pipe and harms longevity. One aim of the invention is therefore have a flexible pipe for transporting a fluid, able to convey a fluid at a very high pressure and that is nevertheless very strong over time for dynamic applications.

SUMMARY OF THE INVENTION

To that end, the invention relates to a pipe of the aforementioned type, characterized in that the pipe includes an intermediate polymer sheath, interposed between the inner sheath and the outer sheath, the intermediate sheath and the inner sheath delimiting an inner annular space between them for receiving the inner fluid, the inner fluid being confined in the inner annular space at a pressure above 50 bars.

The pipe according to the invention may include one or more of the following features, considered alone or according to any technically possible combination(s):
- the inner fluid is confined in the inner annular space at a pressure above 200 bars, and in particular comprised between 200 bars and 400 bars;
- it comprises, in the inner annular space, a pressure vault including at least one wire wound around the inner sheath, and optionally a hoop layer, positioned around the pressure vault;
- the wire has a V-shaped profile;
- the wire has a T-, K-, U-, X- or I-shaped profile;
- it comprises, in the inner annular space, at least one vault including at least one aramid strip with a high mechanical strength and/or at least one composite strip comprising a thermoplastic matrix and in which carbon or glass fibers are embedded;
- the or each layer of inner armours is positioned in the inner annular space;
- the or each layer of the inner armours is wound with a spiral angle smaller than 45° in absolute value, in particular comprised between 20° and 45° in absolute value;
- it includes at least one layer of outer armours, positioned between the intermediate sheath and the outer sheath;
- the or each layer of outer armours is wound with a spiral angle larger than 45° in absolute value, in particular comprised between 50° and 60° in absolute value;

it includes an outer vault positioned between the intermediate sheath and the outer sheath, the outer sheath comprising a metal wire and/or a high-strength strip and/or a composite strip;

it includes an outer maintaining strip for the or each layer of outer armours positioned between the layer of outer armours and the outer sheath;

it includes an inner carcass, positioned in the inner sheath, the inner carcass advantageously being formed from an interlocked metal sheet.

The invention also relates to the use of a pipe as defined above for conveying, in the inner passage, a fluid at a pressure above 400 bars, in particular above 700 bars.

The invention also relates to a method for producing a flexible pipe, including the following steps:

providing an inner polymer sheath, the inner sheath defining an inner passage for the flow of a conveyed fluid;

arranging at least one layer of the inner tensile armours outside the inner sheath;

arranging an outer polymer protection sheath, outside the layer of inner armours;

injecting an inner fluid between the inner sheath and the outer sheath;

characterized in that it includes inserting an intermediate polymer sheath, between the inner sheath and the outer sheath, the intermediate sheath and the inner sheath defining an inner annular space between them for receiving the inner fluid, the method including confining the inner fluid in the inner annular space at a pressure above 50 bars.

BRIEF DESCRIPTION OF THE DRAWINGS

The invention will be better understood upon reading the following description, provided solely as an example and done in reference to the appended drawings, in which:

FIG. 1 is a partial cutaway perspective view of a flexible pipe according to the invention;

FIG. 3 is a partial diagrammatic view, in section along a median axial plane, of a detail of the pipe of FIG. 1, illustrating the pressurized inner annular space of the pipe;

DESCRIPTION OF PREFERRED EMBODIMENTS

In the rest of this document, the terms "outer" or "outward" and "inner" or "inward" are generally to be understood radially relative to an axis A-A' of the pipe, the term "outer" being understood as being relatively radially further from the axis A-A' and the term "inner" being understood as being relatively radially closer to the axis A-A' of the pipe.

Furthermore, the terms "upstream" and "downstream" are to be understood generally relative to the normal flow direction of an oil fluid within the pipe.

The pressures mentioned are differential pressures, unless otherwise indicated. The pressures mentioned must in particular be interpreted relative to the description of a particular pipe with an inner diameter equal to 152 mm (6"), considered to illustrate the structure and performance of the pipe according to the invention.

Figure 2:
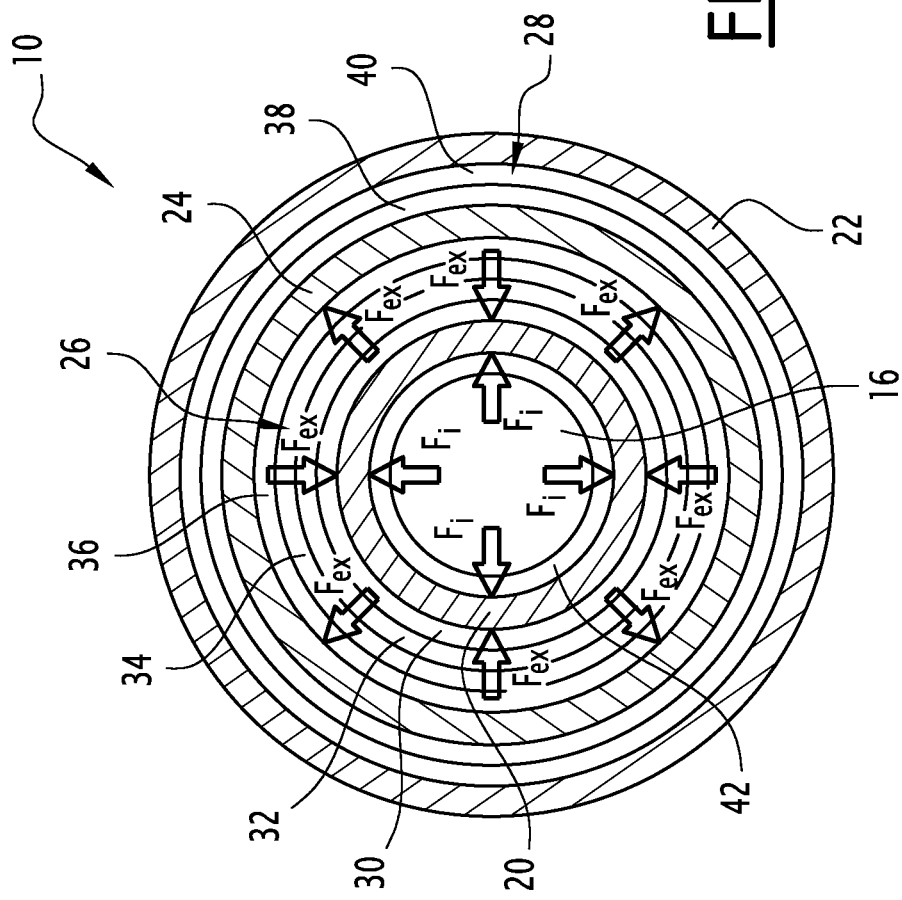
FIG. 2 is a partial diagrammatic sectional view along a plane transverse to the pipe of FIG. 1.

A first flexible pipe 10 according to the invention is partially illustrated in FIGS. 1 to 3.

The flexible pipe 10 includes a central segment 12 illustrated partially in FIG. 1. It includes, at each of the axial ends of the central segment 12, an end end-piece (not shown).

In reference to FIG. 1, the pipe 10 delimits a central passage 16 for the flow of a fluid, advantageously an oil fluid. The central passage 16 extends along an axis A-A', between the upstream end and the downstream end of the pipe 10. It emerges through the end-pieces.

The diameter of the central passage 16 is advantageously comprised between 50 mm (2") and 500 mm (20").

The fluid conveyed by the pipe is for example a gas or liquid extracted from the subsoil, or reinjected therein. In one particular application, the fluid is a carbon dioxide-rich gas (for example containing more than 1 mol % of carbon dioxide), designed to be reinjected in the subsoil, advantageously at the bottom of an expanse of water.

The pressure of the fluid flowing in the pipe is for example greater than 400 bars, in particular greater than 700 bars and advantageously comprised between 900 bars and 1100 bars.

The flexible pipe 10 is designed to be positioned through an expanse of water (not shown) in a fluid exploitation facility, in particular for hydrocarbons.

The expanse of water is for example a sea, lake or ocean. The depth of the expanse of water at the fluid exploitation installation is for example comprised between 50 m and 3000 m.

The fluid exploitation installation includes a surface assembly, generally floating, and a bottom assembly (not shown), that are generally connected to one another by the flexible pipe 10.

The flexible pipe 10 is preferably an "unbonded" pipe.

At least two adjacent layers of the flexible pipe 10 are free to move longitudinally relative to one another when the pipe bends.

Advantageously, all of the layers of the flexible pipe are free to move relative to one another. Such a pipe is for example described in the normative documents published by the American Petroleum Institute (API), API 17J and API RP 17B.

As illustrated by FIG. 1, the pipe 10 delimits a plurality of concentric layers around the axis A-A', which extend continuously along the central segment 12 up to the end-pieces situated at the ends of the pipe.

According to the invention, the pipe 10 includes at least one first sheath 20 with a base of a polymer material forming a pressure sheath. The pipe 10 comprises a second outer sheath 22, designed to protect the pipe 10, and according to the invention, a tight intermediate sheath 24 inserted between the inner sheath 20 and the outer sheath 22.

The intermediate sheath 24 defines, with the inner sheath 20, an inner annular space 26 designed to be pressurized by an inner fluid. It defines, with the outer sheath 22, an outer annular space 28 armour the intermediate sheath 24.

In the inner annular space 26, the pipe 10 includes a pressure vault 30, and optionally an inner hoop layer 32 wound around the pressure vault 30.

The pipe 10 further includes, in the inner annular space 26, a plurality of layers of inner tensile armours 34, 36 positioned outwardly relative to the pressure vault 30 and relative to the hoop layer 32.

In the outer annular space 28, the pipe 10 includes a plurality of tensile armour layers 38, 40 positioned outwardly around the intermediate sheath 24. According to an alternative embodiment of the invention, the tensile armour layers 38, 40 are replaced by a pressure vault formed by a profiled metal wire having a T-, U-, K-, X- or I-shaped geometry and/or from at least one strip of aramid with a high mechanical strength (Technora® or Kevlar®), and/or from at least one composite strip comprising a thermoplastic matrix in which carbon fibers or glass fibers are embedded.

Preferably, the pipe 10 further includes an inner carcass 42 positioned inside the inner sheath 20.

When the carcass 42 is present, it is formed by a profiled metal sheet, wound in a spiral. As illustrated by FIG. 3, the turns of the sheet are advantageously stapled to one another, which makes it possible to react the radial crushing forces.

The helical winding of the profiled metal sheet forming the carcass 42 has a short pitch, i.e., it has a spiral angle with an absolute value close to 90°, typically comprised between 75° and 90°.

In this example, the carcass 42 is positioned inside the pressure sheath 20.

The pipe is then designated by the term "rough bore" due to the geometry of the carcass 42.

In an alternative that is not shown, the flexible pipe 10 has no inner carcass 42, and is then referred to as "smooth bore".

In a known manner, the inner sheath 20 is designed to tightly confine the fluid transported in the passage 16. It is made from a polymer material, for example with a base of a polyolefin such as polyethylene, a base of a polyamide such as PA11 or PA12, or a base of a fluorinated polymer such as polyvinylidene fluoride (PVDF).

The thickness of the inner sheath 20 is for example comprised between 5 mm and 20 mm.

In this example, the pressure vault 30 is designed to react the forces related to the pressure prevailing inside the pressure sheath 20. It is for example formed by a metal profiled wire wound in a spiral around the sheath 20. The profiled wire preferably has a geometry that is in particular Z-shaped. The Z-shaped geometry makes it possible to improve the general mechanical strength of the pipe 10 and also makes it possible to reduce its mass.

Alternatively, the profiled wire has a geometry in the shape of a T, U, K, X or I.

The pressure vault 30 is wound in a spiral with a short pitch around the inner sheath 20, i.e., with a spiral angle with an absolute value close to 90°, typically comprised between 75° and 90°.

The hoop layer 32 is made up of a spiral winding of at least one wire advantageously with a rectangular cross-section around the pressure vault 30.

The superposition of several wires wound around the pressure vault 30 can advantageously replace a given total hoop layer thickness 32. This makes it possible to increase the burst strength of the pipe 10, and to decrease the risk of fatigue-fretting. The winding of the at least one wire has a short pitch, i.e., with a spiral angle having an absolute value close to 90°, typically comprised between 75° and 90°.

In one alternative embodiment of the invention, the pressure vault 30 and the hoop layer 32 are replaced by a pressure vault with a greater thickness formed from a profiled metal wire having a T-, U-, K-, X- or I-shaped geometry, and/or from at least one strip of aramid with a high mechanical strength (Technora® or Kevlar®), and/or from at least one composite strip comprising a thermoplastic matrix in which carbon fibers or glass fibers are embedded.

In the example shown in FIG. 1, the flexible pipe 10 includes at least one pair of inner armour layers 34, 36, one of which is shown in FIG. 1.

Alternatively, the flexible pipe 10 includes several pairs of inner armour layers 34, 36 superimposed on one another, for example two pairs of inner armour layers 34, 36.

Each pair includes a first inner armour layer 34 applied on the hoop layer 32 or on another pair of inner armour layers, and a second inner armour layer 36, positioned around the first inner armour layer 34.

Each inner armour layer 34, 36 includes at least one longitudinal armour element 44 wound with a long pitch around the axis A-A' of the pipe 10.

"Wound with a long pitch" means that the absolute value of the spiral angle is less than 60°, and is typically comprised between 20° and 60°.

In the example shown in FIG. 1, the absolute value of the spiral angle of each layer of inner armours 34, 36 is less than 45°, and is in particular comprised between 20° and 30°, and is approximately equal to 25°.

The armour elements 44 of a first layer 34 are generally wound by an opposite angle relative to the armour elements 44 of a second layer 36. Thus, if the winding angle of the armour elements 44 of the first layer 34 is equal to +α, a being comprised between 20° and 60°, the winding angle of the armour elements 44 of the second layer 36 positioned in contact with the first layer 34 is for example −α, with a comprised between 20° and 60°.

The armour elements 44 are for example formed by metal wires or wires made from a composite material, or by tapes with a high mechanical strength.

In this example, each armour layer 34, 36 rests on at least one anti-wear strip. The anti-wear strip is for example made from plastic, in particular with a base of polyamide or polyvinylidene fluoride (PVDF). It has a thickness smaller than the thickness of each sheath 20, 22, 24.

The intermediate sheath 24 is designed to confine the pressurized inner fluid in the inner annular space 26. It is advantageously made from a polymer material, in particular with a base of a polyolefin, such as polyethylene, a base of a polyamide, such as PA11 or PA12, or a base of a fluorinated polymer such as polyvinylidene fluoride (PVDF).

The thickness of the inner sheath 24 is for example comprised between 5 mm and 15 mm.

The inner fluid is received tightly in the inner annular space 26. It has a pressure above 50 bars, advantageously above 200 bars, and in particular comprised between 200 bars and 400 bars.

Figure 4:
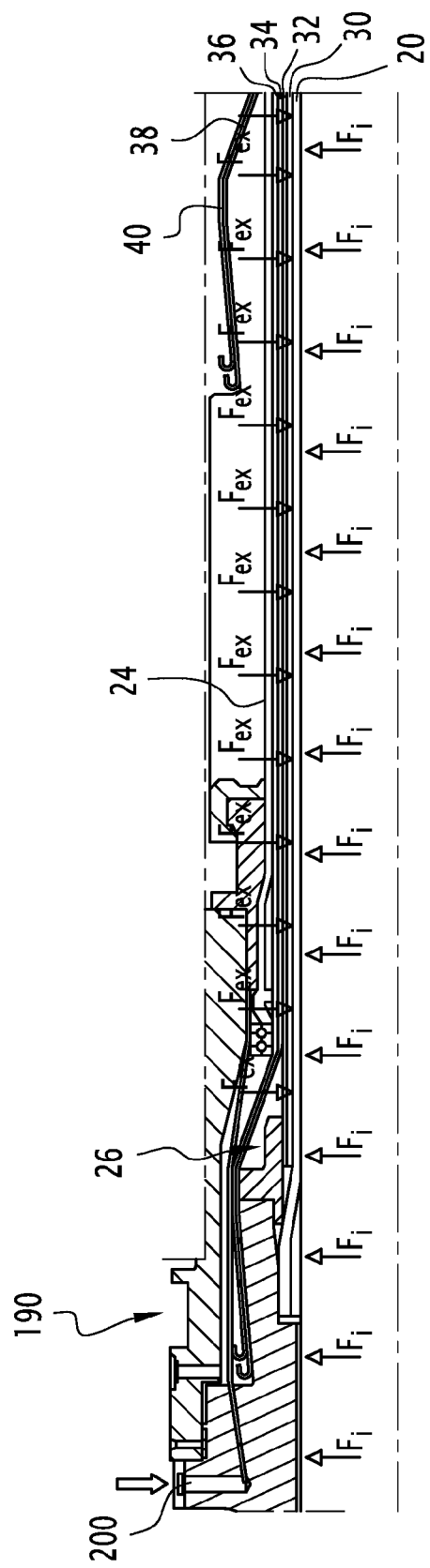
FIG. 4 is a partial diagrammatic view, in section along a median axial plane of the pipe of FIG. 1, illustrating the crimping of the pressurized inner annular space of the pipe.

It is inserted into the inner annular space 26 advantageously through a channel 200 arranged in an end end-piece, more specifically in the top part of the pipe 10. One example channel 200 is shown in FIG. 4.

The inner fluid is advantageously a liquid, the pressure of which is more easily controllable, such as an oil, a hydrocarbon, in particular hexane, a protection liquid for example comprising a glycol, in particular monoethylene glycol, the protection liquid advantageously comprising an alcohol. Alternatively, the inner fluid is a neutral gas, such as nitrogen.

Furthermore, the inner fluid makes it possible to protect the metal armour element 30, 32, 34, 36 of the annular space 26.

The liquid preferably has a density close to that of seawater. As will be seen below, the presence of the pressurized inner fluid, confined by the intermediate sheath 24, applies a back pressure on the inner sheath 20.

This considerably decreases the axial stresses experienced by the pressure vault 30 and the hoop layer 32, as well as the radial contact pressure stresses exerted at the interface between the layers 30 and 32.

Thus, the fatigue and fatigue-fretting phenomena are significantly reduced as a result, in general, within the inner annular space 26, even when the pressure of the fluid flowing in the central passage 16 is high, for example when it is above 400 bars, in particular above 700 bars.

Furthermore, the pressurized inner fluid makes it possible to significantly push back the limits of the current capacities in terms of acceptable internal pressure by the underwater flexible ducts of the unbonded type.

Advantageously, when the pressure vault 30 is formed with wires having a Z-shaped profile, this phenomenon is still further reduced.

Thus and advantageously, since the back pressure exerted by the inner fluid present in the inner annular space 26 offsets the pressure from the hydrocarbon fluid exerted on the inner sheath 20, the service pressure can be greatly increased within the central passage 16.

Furthermore, if the pressure of the hydrocarbon fluid flowing in the central passage 16 is kept at a given service pressure, the back pressure exerted on the pressure sheath 30 significantly offsets the service pressure. This thus makes it possible to reduce the dimensions of the wires used to form the pressure vault and therefore to decrease the mass of the flexible pipe 10.

Preferably, using a hoop layer 32 comprising more than two wires wound with a short pitch around the pressure vault 30 reduces the fatigue-fretting phenomenon.

In the example shown in FIG. 1, the flexible pipe 10 includes at least one pair of outer armours 38, 40, one of which is shown in FIG. 1.

Alternatively, the flexible pipe 10 includes several pairs of outer armour layers 38, 40 superimposed on one another, for example two pairs of outer armour layers 38, 40.

Each pair includes a first layer of outer armours 38, applied on the intermediate sheath 24 or on another pair of outer armour layers, and a second layer of outer armours 38, positioned around the first layer of outer armours 36.

Each layer of outer armours 38, 40 includes at least one longitudinal armour layer 44 wound with a long pitch around the axis A-A' of the pipe 10.

"Wound with a long pitch" means that the absolute value of the spiral angle is less than 60°, and is typically comprised between 20° ad 60°.

Preferably, in the example shown in FIG. 1, the absolute value of the spiral angle of each layer of outer armours 34, 36 is greater than 45°, and is in particular comprised between 50° and 60°, and is approximately equal to 55°.

The armour elements 44 of a first layer 38 are generally wound along an opposite angle relative to the armour elements 44 of a second layer 40.

Thus, if the winding angle of the armour elements 44 of the first layer 38 is equal to +α, α being comprised between 20° and 60°, the winding angle of the armour elements 44 of the second layer 40 positioned in contact with the first layer 38 is for example −α, with a comprised between 20° and 60°.

The armour elements 44 are for example formed by metal or composite wires, or by tapes.

Alternatively, the outer armour layers 38, 40 are replaced by an "outer" pressure vault formed from a metal profiled wire having a T-, U-, K-, X- or I-shaped geometry, and/or at least one aramid strip with a high mechanical strength (Technora® or Kevlar®), and/or from at least one composite strip comprising a thermoplastic matrix in which carbon fibers or glass fibers are embedded.

In this example, each armour layer 38, 40 rests on at least one anti-wear strip. The anti-wear strip is for example made from plastic, in particular with a base of polyamide or polyvinylidene fluoride (PVDF). It has a thickness smaller than the thickness of each sheath 20, 22, 24.

Advantageously, a maintaining tape is wound around the second layer of outer armours 40 that is outermost relative to the axis A-A', to ensure mechanical maintenance of the outer armour layers 38, 40.

The outer sheath 22 is designed to protect the annular space 26 by preventing fluid from penetrating from the outside of the flexible pipe 10 toward the inside. It is advantageously made from a polymer material, in particular with a base of a polyolefin, such as polyethylene, a base of a polyamide, such as PA11 or PA12, or a base of a fluorinated polymer such as polyvinylidene fluoride (PVDF).

The thickness of the outer sheath 22 is for example comprised between 5 mm and 15 mm.

The production of the pipe 10 will now be described.

First, the carcass 42 is assembled. The first sheath 20 is formed around the carcass 42, for example by extruding the polymer making it up.

Then, the vault 30 and the hoop layer 32 are wound around the first sheath 20. The inner armour layers 34, 36 are next placed around the hoop layer 32.

The intermediate sheath 24 is then formed around inner armour layers 34, 36, advantageously by extruding the polymer making it up.

The outer armour layers 38, 40 are next placed around the intermediate sheath 24.

The outer armour layer 22 is then formed around the outer armour layers 38, 40, advantageously by extruding the polymer making it up.

The end-pieces 190 of the pipe 10 are then installed at the ends of the central segment 12. This installation closes off the inner annular space 26.

Then, at the end of manufacturing of the pipe 10 and before subjecting it to a Factory Acceptance Test, the inner fluid is introduced into the inner annular space 26 by means of the end-pieces previously installed and within which a channel 200 is arranged for introducing inner fluid, as shown in FIG. 4.

Once the pipe 10 is installed in the expanse of water advantageously either using a tow-in laying method, in particular in the case where the pipe includes an outer pressure vault wound with a short pitch to replace armour elements 44, or advantageously using a vertical laying method, in particular if the pipe comprises armour elements 44 wound with a long pitch, and during commissioning, the inner fluid is confined in the space 26, at a pressure above 50 bars, advantageously above 200 bars, and in particular comprised between 200 bars and 400 bars.

The pressurization of the inner annular space 26 is maintained throughout the entire service duration of the flexible pipe 10, notwithstanding stop periods of production to perform maintenance operations.

In the event the pressurization of the annular space 26 is no longer ensured, the pressure vault 30 and the hoop layer 32, wound with a short pitch, are dimensioned to react the radial force exerted by the service pressure during a reduced length of time.

Conversely, if the service pressure drops, while the pressure in the annular space 26 is maintained, the carcass is sized to react the radial crushing force exerted.

During the use of the pipe, pressurized fluid flows in the inner passage 16, for example a pressure above 400 bars, in particular comprised between 700 bars and 1100 bars.

As shown in FIGS. 2 and 4, the presence of the pressurized inner fluid confined permanently in the inner annular space 26 offsets the radial pressure forces exerted by the fluid flowing in the inner passage 16.

The inner arrow Fi corresponds to the radial pressure exerted by the hydrocarbon fluid flowing within the inner passage 16 of the pipe 10, at the inner surface of the pressure sheath 20. The outer arrow Fex corresponds to the radial pressure (or back pressure) exerted by the inner fluid present within the inner annular space 26, at the outer surface of the pressure sheath 20 and the inner surface of the intermediate sheath 24.

The radial pressures applied on the pressure sheath 20 shown by the arrows Fi and Fex are oriented radially to the center of the pipe 10, but in opposite directions.

This then allows a significant decrease in the fatigue and fatigue-fretting phenomena that may appear due to the very high pressure applied within the inner annular space 26.

The outer armour layers 38, 40 make it possible to maintain the pressure of the inner annular space 26.

In one alternative, the pressure exerted by the inner fluid confined in the inner annular space 26 is adjustable. In this way, the fatigue phenomena can be managed precisely over time, therefore ensuring a longer lifetime for the pipe 10.

Furthermore, the second annular space or outer annular space 28 provides general protection for the pipe, in particular regarding the hoop layer stress generated at the inner annular space 26. The pipe 10 can in particular be used to reinject a fluid under very high pressure, such as a carbon dioxide-rich gas, in the subsoil.

In all of the preceding, the pressure values have been mentioned in reference to a pipe with a diameter approximately equal to 152 mm.

What is claimed is:

1. A flexible pipe for conveying a fluid, comprising:
   an inner polymer sheath defining an inner passage for the circulation of a conveyed fluid;
   at least one layer of inner armours, arranged outside the inner sheath;
   a polymer outer protection sheath, positioned outside each layer of inner armours;
   an inner fluid, received between the inner sheath and the outer sheath;
   a tight intermediate polymer sheath, interposed between the inner sheath and the outer sheath, the intermediate sheath and the inner sheath delimiting an inner annular space between them for receiving the inner fluid, the inner fluid being confined in the inner annular space at a differential pressure above 50 bars.

2. The pipe according to claim 1, wherein the inner fluid is confined in the inner annular space at a differential pressure above 200 bars.

3. The pipe according to claim 2, wherein said differential pressure is comprised between 200 bars and 400 bars.

4. The pipe according to claim 1, comprising, in the inner annular space, a pressure vault including at least one wire wound around the inner sheath.

5. The pipe according to claim 4, comprising a hoop layer positioned around the pressure vault.

6. The pipe according to claim 1, the wire has a Z-shaped profile.

7. The pipe according to claim 1, wherein the wire has a T-, K-, U-, X- or I-shaped profile.

8. The pipe according to claim 1, comprising, in the inner annular space, at least one vault including at least one among at least one aramid strip with a high mechanical strength, or at least one composite strip comprising a thermoplastic matrix and in which carbon or glass fibers are embedded.

9. The pipe according to claim 1, wherein the at least one layer of inner armours is positioned in the inner annular space.

10. The pipe according to claim 1, further comprising at least one layer of inner armours wound with a spiral angle less than 45° in absolute value.

11. The pipe according to claim 10, wherein said spiral angle is comprised between 20° and 45° in absolute value.

12. The pipe according to claim 1, including at least one layer of outer armours, positioned between the intermediate sheath and the outer sheath.

13. The pipe according to claim 12, wherein the at least one layer of outer armours is wound with a spiral angle larger than 45° in absolute value.

14. The pipe according to claim 13, wherein said spiral angle is comprised between 50° and 60° in absolute value.

15. The pipe according to claim 12, including an outer vault positioned between the intermediate sheath and the outer sheath, the outer sheath comprising at least one of a metal wire, a high-strength strip, or a composite strip.

16. The pipe according to claim 12, including an outer maintaining strip for at least one of the layer of outer armours positioned between the layer of outer armours and the outer sheath.

17. The pipe according to claim 1, including an inner carcass, positioned in the inner sheath.

18. The pipe according to claim 17, wherein said inner carcass is formed from an interlocked metal sheet.

19. A method for conveying a fluid comprising the following steps:
   providing a pipe according to claim 1, and;
   conveying in the inner passage a fluid at a differential pressure above 400 bars.

20. The method of claim 19, wherein said differential pressure is above 700 bars.

21. A method for producing a flexible pipe, including the following steps:
   providing an inner polymer sheath, the inner sheath defining an inner passage for the circulation of a conveyed fluid;
   arranging at least one layer of the inner tensile armours outside the inner sheath;
   arranging an outer polymer protection sheath, outside the layer of inner armours;
   injecting an inner fluid between the inner sheath and the outer sheath;
   interposing of an intermediate polymer sheath, between the inner sheath and the outer sheath, the intermediate sheath and the inner sheath delimiting an inner annular space between them for receiving the inner fluid, the method including confining the inner fluid in the inner annular space at a differential pressure above 50 bars.

* * * * *